United States Patent
Granshaw et al.

(10) Patent No.: US 10,171,572 B2
(45) Date of Patent: Jan. 1, 2019

(54) SERVER POOL MANAGEMENT

(71) Applicant: INTERNATIONAL BUSINESS MACHINES CORPORATION, Armonk, NY (US)

(72) Inventors: David Granshaw, Hursley (GB); Daniel J. McGinnes, Hursley (GB); Samuel T. Massey, Hursley (GB); Martin A. Ross, Hursley (GB); Richard Graham Schofield, Hursley (GB); Craig H. Stirling, Hursley (GB)

(73) Assignee: International Business Machines Corporation, Armonk, NY (US)

(*) Notice: Subject to any disclaimer, the term of this patent is extended or adjusted under 35 U.S.C. 154(b) by 226 days.

(21) Appl. No.: 15/001,859

(22) Filed: Jan. 20, 2016

(65) Prior Publication Data
US 2017/0208121 A1 Jul. 20, 2017

(51) Int. Cl.
*G06F 15/173* (2006.01)
*H04L 29/08* (2006.01)
*H04L 12/26* (2006.01)

(52) U.S. Cl.
CPC ...... *H04L 67/1012* (2013.01); *H04L 43/0882* (2013.01)

(58) Field of Classification Search
CPC .......... H04L 67/1012; H04L 43/0882
USPC ......................................... 709/224
See application file for complete search history.

(56) References Cited

U.S. PATENT DOCUMENTS

| | | | |
|---|---|---|---|
| 8,386,995 B2 | 2/2013 | Coleman et al. | |
| 8,959,217 B2 | 2/2015 | Mayo et al. | |
| 2011/0231551 A1* | 9/2011 | Hassan | H04L 12/1421 709/226 |
| 2012/0265881 A1 | 10/2012 | Chen et al. | |
| 2013/0086235 A1 | 4/2013 | Ferris | |
| 2013/0159501 A1* | 6/2013 | Meier | G06F 9/5083 709/224 |
| 2014/0040474 A1 | 2/2014 | Blagodurov et al. | |
| 2014/0165070 A1* | 6/2014 | Persikov | G06F 9/4881 718/103 |

(Continued)

OTHER PUBLICATIONS

Han, Rui et al., "Lightweight Resource Scaling for Cloud Applications," 12th IEEE/ACM International Symposium on Cluster, Cloud and Grid Computing, May 2012, pp. 1-9.

(Continued)

*Primary Examiner* — Vivek Srivastava
*Assistant Examiner* — Atta Khan
(74) *Attorney, Agent, or Firm* — Heslin Rothenberg Farley & Mesiti P.C.; Richard Wilhelm

(57) ABSTRACT

Managing a system comprising a pool of servers including a number of active servers. Utilization of the system capacity is monitored, in which the utilization results from a workload of the number of active servers. Upon detecting a critical utilization of the system capacity during the monitoring of the utilization of the system capacity, a duration of the detected critical utilization of the system capacity is predicted from a monitoring history of the utilization of the system capacity. Further, the number of active servers is increased, if the predicted duration exceeds a defined threshold. Tuning measures may also be deployed to handle surges in capacity utilization.

20 Claims, 5 Drawing Sheets

(56) References Cited

U.S. PATENT DOCUMENTS

2014/0379722 A1* 12/2014 Mysur ..................... G06F 3/067
707/740
2015/0180719 A1* 6/2015 Wu ..................... H04L 41/0896
709/224

OTHER PUBLICATIONS

Blagodurov, Sergey et al., "Maximum Server Utilization While Meeting Critical SLAS Via Weight-Based Collocation Management," 2013 IFIP/IEEE International Symposium on Integrated Network Management, May 2013, pp. 1072-1073.

Pantazoglu, M. et al., "Decentralized and Energy-Efficient Workload Management in Enterprise Clouds," Aug. 2015, pp. 1-14.

* cited by examiner

SERVER POOL MANAGEMENT

BACKGROUND

Embodiments of the present invention are concerned with facilitating server pool management.

Computer systems having a configurable pool of resources, i.e. a pool of servers of which at least a subset is active, are commonly deployed to handle a variable number of tasks such as service requests or the like. An example of such a computer system is a cloud-based computer system providing services over a network such as the Internet.

It is desirable to manage the capacity utilization of such a system. If the system capacity is underutilized, this may mean that too many servers are active, e.g. perform at a fraction of their individual capacity, which means that energy is being wasted due to the fact that the idle part of the server capacity still causes energy to be consumed, e.g. through execution of no operation instructions or the like. If the system capacity is overutilized, this may mean that too few servers are active, which may cause performance penalties such as increased throughput time for the tasks to be executed by the computer system.

Solutions exist that adjust the system capacity based on pending workload, e.g. by adding or removing servers from the active server pool. In this manner, the system utilization is intended to be relatively constant and effectively utilized. However, altering the number of active servers comes at a performance penalty in terms of additional energy consumption and reduced energy efficiency associated with start-up or shut-down of an active server. This is particularly problematic where servers are added to the pool of active servers to cope with short-lived increases in demand for system capacity. Such energy management is not only desirable from a cost perspective, but also from an operability perspective, e.g. to facilitate temperature control in a confined space housing the servers, e.g. a data center. Excessive consumption of energy can cause the temperature in such confined spaces to become too high, i.e. outside a safe operating range for the servers.

SUMMARY

One or more aspects of the present invention seek to provide a computer-implemented method that facilitates the effective utilization of the capacity of a computer system comprising a pool of servers including a number of active servers.

One or more aspects of the present invention further seeks to provide a computer program product that facilitates the effective utilization of the capacity of a computer system comprising a pool of servers including a number of active servers.

Yet further, one or more aspects of the present invention seek to provide a computer system comprising a pool of servers including a number of active servers that facilitates the effective utilization of its capacity.

According to an aspect, there is provided a computer-implemented method of managing a system including a pool of servers including a number of active servers, the method includes monitoring the utilization of the system capacity, the utilization resulting from a workload of the number of active servers; based on detecting a critical utilization of the system capacity during monitoring of the utilization of the system capacity: predicting a duration of the detected critical utilization of the system capacity from a monitoring history of the utilization of the system capacity; and increasing the number of active servers based on the predicted duration exceeding a defined threshold.

According to another aspect, there is provided a computer system including a pool of servers including a number of active servers. The computer system is configured to perform a method. The method includes monitoring utilization of system capacity, the utilization resulting from a workload of the number of active servers; based on detecting a critical utilization of the system capacity, based on the monitoring of the utilization of the system capacity: predicting a duration of the detected critical utilization of the system capacity from a monitoring history of the utilization of the system capacity; and increasing the number of active servers based on the predicted duration exceeding a defined threshold.

According to yet another aspect, there is provided a computer program product for managing a system including a pool of servers including a number of active servers. The computer program product includes a computer readable storage medium readable by a processing circuit and storing instructions for execution by the processing circuit for performing a method. The method includes monitoring utilization of system capacity, the utilization resulting from a workload of the number of active servers; based on detecting a critical utilization of the system capacity, based on the monitoring of the utilization of the system capacity: predicting a duration of the detected critical utilization of the system capacity from a monitoring history of the utilization of the system capacity; and increasing the number of active servers based on the predicted duration exceeding a defined threshold

BRIEF DESCRIPTION OF THE DRAWINGS

Embodiments of the present invention will now be described, by way of example only, with reference to the following drawings, in which.

DETAILED DESCRIPTION

Figure 1:
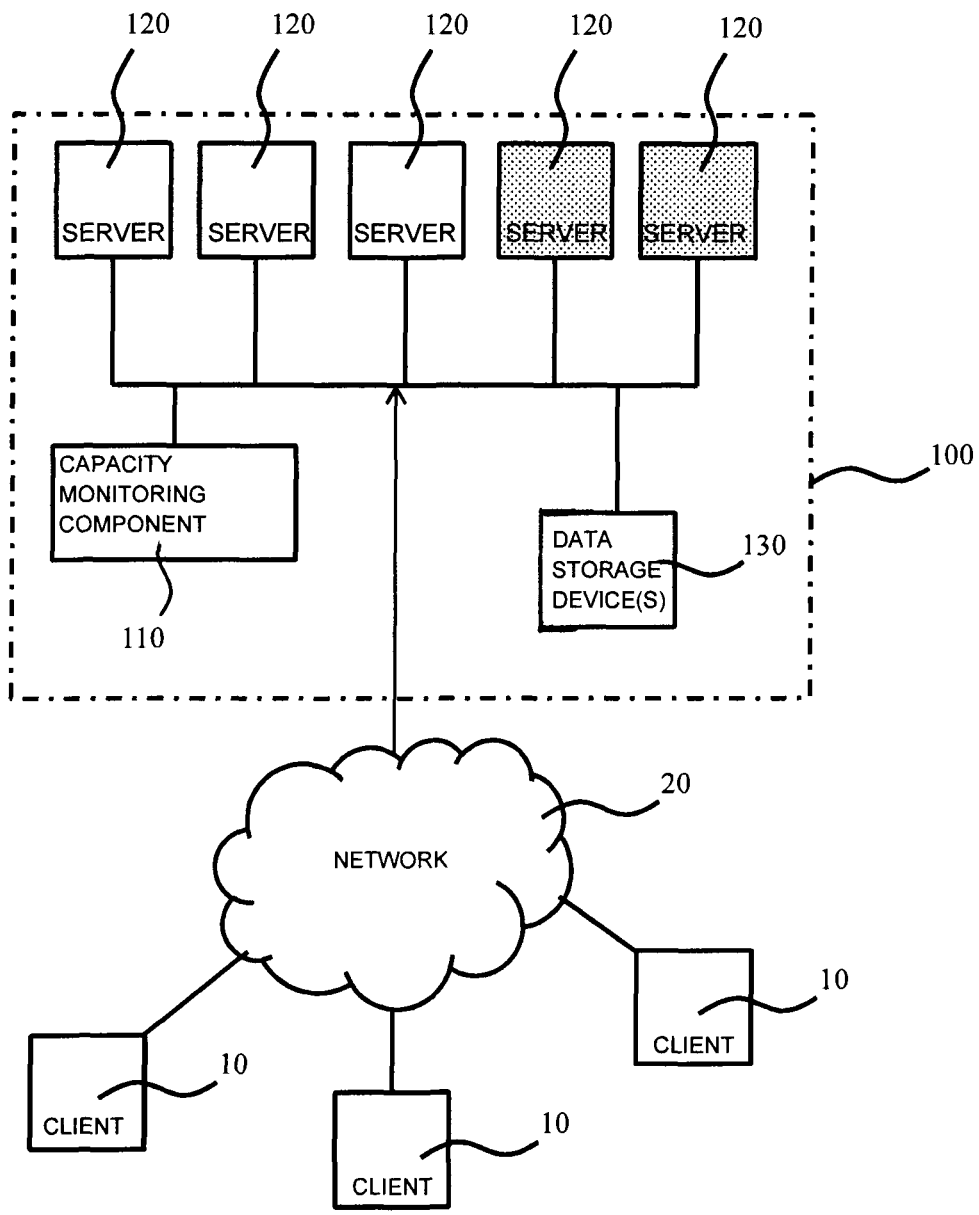
FIG. 1 schematically depicts a computer system according to an embodiment.

It should be understood that the Figures are merely schematic and are not drawn to scale. It should also be understood that the same reference numerals are used throughout the Figures to indicate the same or similar parts.

In the context of aspects of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

In the context of aspects of the present application, a computer system may be embodied by a single device or by a collection of grouped or distributed devices that are adapted to execute one or more embodiments of the methods of aspects of the present invention. For instance, a computer system may be a personal computer (PC), a server or a collection of PCs and/or servers connected via a wired or wireless network such as a local area network, the Internet and so on to cooperatively execute at least one embodiment of the methods of aspects of the present invention.

FIG. 1 schematically depicts a typical service provision architecture in which a plurality of clients 10 request one or more services from a computer system 100 over a network 20. The network 20 may be any suitable network, e.g. wired networks such as a LAN (local area network) or the Internet, wireless networks such as mobile communication networks, Wi-Fi networks, and so on. In an embodiment, the clients 10 communicate with the computer system 100 using a well-known communication protocol such as TCP/IP (Transmission Control Protocol/Internet Protocol), e.g. by communicating messages or packets using HTTP (Hypertext Transfer Protocol) or other suitable protocols.

The clients 10 may take any suitable form, for example be any suitable computing device configured to request a connection with the computer system 100 in order to receive one or more services from the computer system 100 over such a connection, e.g. a portable desktop computer, a smart portable device such as a smart phone or tablet computer, a client server, and so on.

The computer system 100 typically comprises a cluster of servers 120 that may be assigned client connections in any suitable manner, e.g. by a load balancing component (not shown). The computer system 100 may take any suitable shape, for example may comprise one or more computers acting as servers, each computer may be individually one of a network server, an application server, or a blade server and so on. Each server 120 may be embodied by a physical server or at least some of the servers 120 may be virtual machines hosted by a physical server. Such a physical server may host any suitable number of virtual machines. In an embodiment, all servers 120 are virtual servers, i.e. virtual machines hosted by one or more physical servers. Two or more networked servers may share in the execution of at least portions of a same application, program, function, or other assemblage of programmable and executable code. The servers 120 may be clones of each other in the sense that each server 120 provides the same functionality, e.g. the same service to clients 10, such that each server 120 in the cluster of servers can be chosen to provide that service to a requesting client 10.

The computer system 100 may further comprise one or more data storage devices 130. In at least some embodiments, the one or more data storage devices 130 may store computer readable program instructions for, when executed on a processor arrangement of the computer system 100 adapted to execute the computer readable program instructions, cause the processor arrangement to execute one or more embodiments of the computer-implemented method that will be described in more detail below. The data storage device(s) 130 may be any suitable data storage device such as a read-only memory, a random access memory, a Flash memory, a solid state disk or disk array, an optical disc or disk array, a magnetic disk or disk array, with some of the data storage devices being connected to the computer system 100 via a network or cable, e.g. in the case of network-attached storage, storage area networks, cloud storage, and so on. Any suitable combination of such well-known data storage devices 130 may form part of the computer system 100.

The computer system 100 typically comprises a processor arrangement distributed over the one or more physical devices of the computer system 100. Such a processor arrangement may comprise any suitable number and type of processors, e.g. multi-purpose processors, application-specific processors such as ASICs (application-specific integrated circuits), and so on, which may be communicatively coupled to the network 20 via any suitable network interface.

The computer system 100 may further comprise one or more input devices, e.g. a keyboard, mouse, voice recognition module, touchscreen, and so on and may further comprise one or more output devices, e.g. a display device such as a computer monitor, an audio output device, a printing device, and so on.

In an embodiment, the servers 120 of the computer system 100 may be switched between an active state highlighted in FIG. 1 by servers 120 represented by a white box, and an inactive or sleep state highlighted in FIG. 1 by servers 120 represented by a hatched box, e.g. to preserve energy by avoiding excessive idling of active servers. The computer system 100 may be adapted to dynamically alter the number of active servers 120, e.g. increase or reduce the number of active servers 120, based on the capacity demands of the computer system 100. In this manner, the utilization efficiency of the system capacity may be optimized by ensuring that each of the active servers 120 operates at a minimum level of utilization, e.g. a utilization level close to the maximum capacity of the server, e.g. at least 70% of its maximum capacity, at least 80% of its maximum capacity, at least 90% of its maximum capacity, or any other suitable performance metric. In this manner, resource utilization is achieved in an energy-efficient manner due to the fact that minimal energy is wasted by underutilized servers 120.

In order to implement such dynamic active server management, the computer system 100 may further comprise a capacity monitoring component 110 that is communicatively coupled to the servers 120 and is adapted to manage the pool of active servers 120, i.e. that is adapted to manage the overall capacity of the computer system 100. For example, the capacity monitoring component 110 may be adapted to increase or decrease the number of active servers 120 in response to the utilization of the available capacity of the computer system 100, e.g. the utilization of the combined CPU processing power of the active servers 120, disk utilization of the computer system 100, and so on. In the context of aspects of the present invention, altering the number of active servers 120 is intended to include altering a number of physical devices acting as servers, e.g. altering the number of active cores in a pool of active servers or altering the number of physical server devices in a pool of active servers, as well as altering the number of virtual servers in a pool of active servers, e.g. the number of software implementations of servers hosted by one or more physical servers.

The capacity monitoring component 110 may be adapted to monitor the capacity utilization of the computer system 100 resulting from an actual workload of the active servers 120. To this end, the capacity monitoring component 110 may periodically communicate with the active servers 120 in any suitable manner, e.g. using any suitable message protocol, in order to obtain the desired capacity utilization information. The capacity monitoring component 110 may be a component separate to the servers 120, e.g. may be hosted by a dedicated hardware device, e.g. a dedicated server, or may be hosted by one of the servers 120, e.g. a server 120 operating as a master server or controller of the remaining servers 120.

The capacity monitoring component 110 may be adapted to build a monitoring history of the system capacity utilization. The capacity monitoring component 110 may be adapted to continuously or periodically update the monitoring history of the system capacity utilization using the monitored actual capacity utilization, e.g. every number of seconds, minutes, hours, i.e. at any suitable frequency. The capacity monitoring component 110 may be adapted to build a system capacity utilization history for a defined period of time, e.g. a day, week, (calendar) month or the like, in order to provide a prediction of typical system capacity utilization at a particular point in time, i.e. a relevant point in time, such that the capacity monitoring component 110 may use the monitoring history of the system capacity utilization to predict a particular utilization of the system capacity at a point in time corresponding to that historical relevant point in time, e.g. a particular time of day. As will be explained in further detail below, the capacity monitoring component 110 may rely on this monitoring history to choose an appropriate adjustment of the system capacity when the monitored system capacity utilization becomes critical, e.g. approaches 100%.

Figure 2:
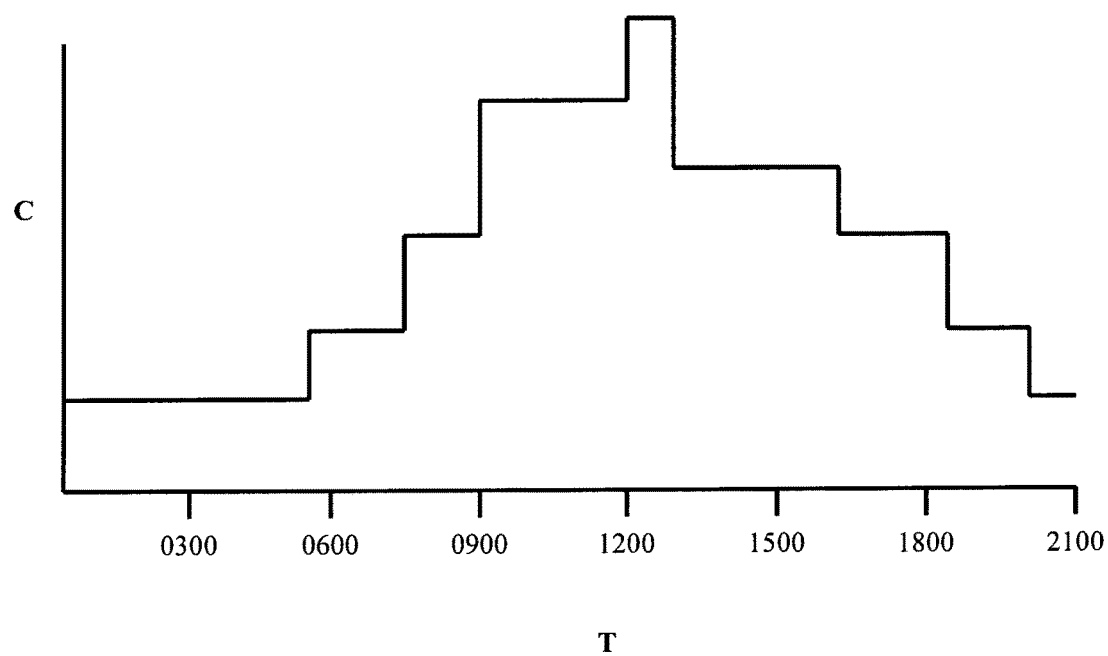
FIG. 2 schematically depicts an example of historical capacity monitoring data utilized by the computer system according to embodiments of the present invention.

FIG. 2 schematically depicts an example monitoring history for a working day as collected by the capacity monitoring component 110. The capacity C on the Y-axis may be the active number of servers at any point in time T during the working day, in which the active number of servers was dynamically altered to maintain a relatively constant capacity utilization rate for the computer system 100. Alternatively, the capacity C on the Y-axis may be an expression of the total capacity the computer system 100 required to handle its workload at any point in time T during the working day, from which the capacity monitoring component 110 may calculate the required number of active servers at the relevant point in time in order to provide the required capacity while being sufficiently utilized.

Figure 3:
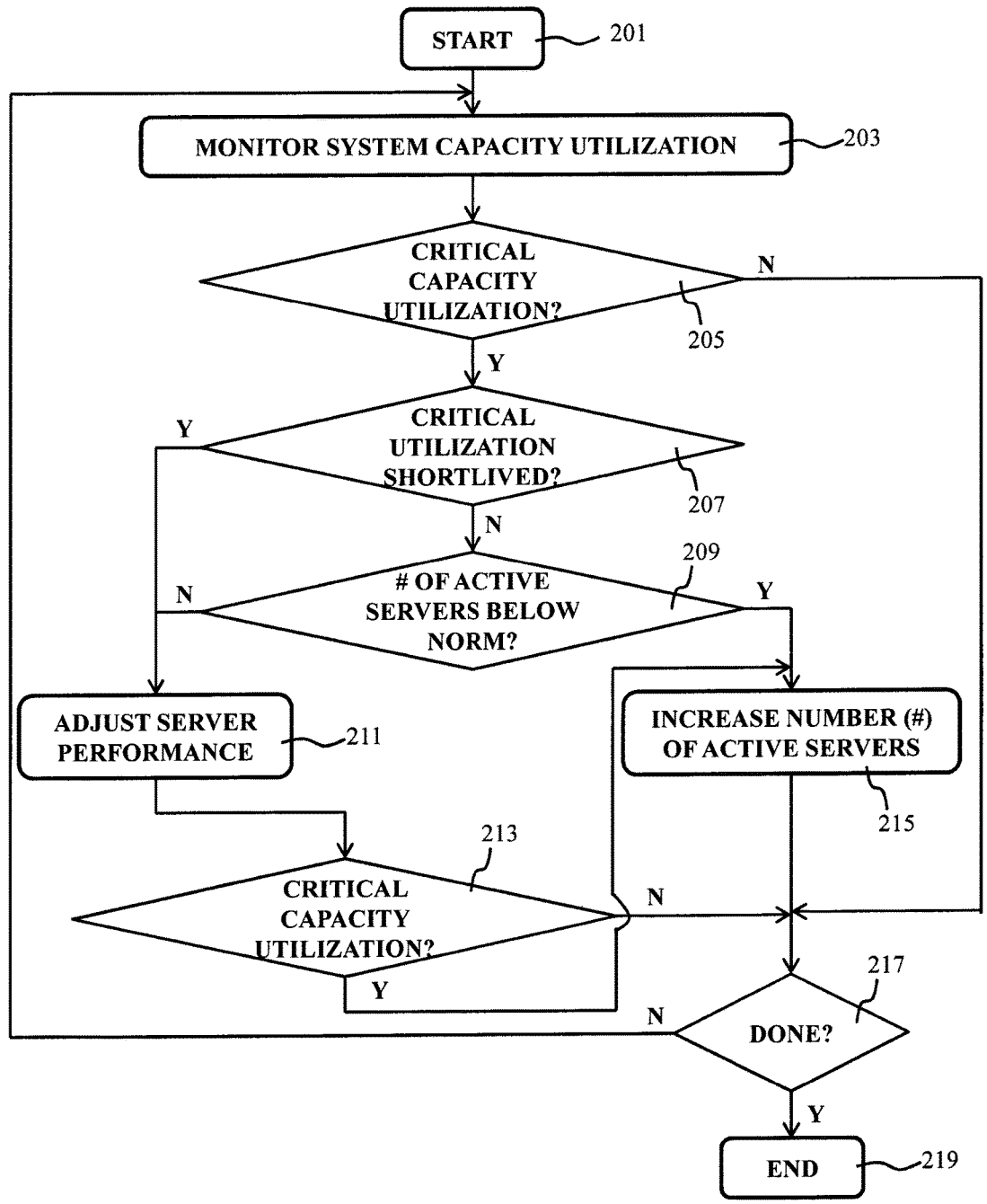
FIG. 3 is a flow chart of a method implemented by a computer system according to an embodiment.

FIG. 3 is a flowchart of a method 200 according to an embodiment implemented by the computer system 100, e.g. at least in part implemented by the capacity monitoring component 110. The method 200 starts in 201, e.g. by starting up the computer system 100 and proceeds to 203 in which the capacity monitoring component 110 monitors the capacity utilization of the computer system 100, such as the utilization of the CPU capacity of the active servers 120 due to the workload being handled by the active servers 120. This may be done in any suitable manner, e.g. by periodically querying the active servers 120, by running CPU utilization monitoring software on the servers 120 that communicates with the capacity monitoring component 110, and so on. Obtaining CPU utilization data is well-known per se and it suffices to say that any suitable method of obtaining such data may be employed.

In at least some embodiments, the capacity monitoring component 110 may use the monitored system capacity utilization to update the system capacity utilization history of the computer system 100. Such an update may be performed in any suitable manner, e.g. by averaging a set of system capacity utilization data points relating to the same relevant point in time, e.g. a particular time of day, which set of data points may comprise a number of historical data points as well as the most recent monitored system capacity utilization data point, i.e. the actual system capacity utilization. The capacity monitoring component 110 may decide to exclude the monitored actual system capacity utilization from the system capacity utilization history if the monitored actual system capacity utilization deviates from the system capacity utilization history at the relevant point in time by more than a defined threshold, i.e. is indicated to be a statistical outlier. Any suitable algorithm for building such a history may be employed. As such algorithms are well-known per se to the person skilled in the art, they will not be explained in further detail for the sake of brevity only.

In 205, the capacity monitoring component 110 checks if the monitored utilization of the system capacity is becoming critical, e.g. exceeds a critical capacity utilization threshold, which may be an indication of the active servers 120 of the computer system 100 becoming overloaded, but this may alternatively be an indication of the active servers 120 of the computer system 100 becoming underutilized. In case of the active servers 120 of the computer system 100 becoming overloaded, this can jeopardize throughput performance of the computer system 100, e.g. causing delays to the processing of service requests from clients 10. This may be particularly undesirable in a scenario where the computer system 100 has to deliver one or more services in accordance with one or more service level agreements with clients 10, where the delays to the processing of such service requests can cause the computer system 100 to be in breach with such a service level agreement.

If the capacity monitoring component 110 decides in 205 that the capacity utilization of the computer system 100 is not critical, the method 200 may proceed to 217 in which it is decided if the capacity monitoring component 110 should continue monitoring the system capacity utilization, in which case the method 200 reverts back to 203. Otherwise, the method 200 terminates in 219. On the other hand, if the capacity monitoring component 110 decides in 205 that the capacity utilization of the computer system 100 is becoming critical, the capacity monitoring component 110 may evaluate the system capacity utilization history of the computer system 100 to determine in 207 if it can be expected that the critical capacity utilization is short-lived, i.e. falls below a minimal threshold that justifies the overhead associated with increasing or decreasing the number of active servers 120 of the computer system 100. If the critical capacity utilization of the system is expected to be short-lived, it may not be desirable to increase or decrease the number of active servers 120 but instead alternative measures to alter the throughput performance of the active servers 120 may be more appropriate.

For example, in FIG. 2, the capacity monitoring component 110 may determine at T=0900 hours that the capacity utilization of the computer system 100 is becoming critical. The monitoring history of the capacity utilization predicts that the capacity utilization will not drop below the monitored level until T=1300 hours, which period may warrant an increase in the number of active servers 120 in order to cope with the expected increased capacity demand. On the other hand, the capacity monitoring component 110 may determine at T=1200 hours that the capacity utilization of the computer system 100 is becoming critical again. In this case the monitoring history of the capacity utilization predicts that the increased capacity utilization will take only 30 minutes, which period may not warrant a change in the number of active servers 120. It should be understood that the time periods for deciding if an increase in server capacity is warranted are given by way of a non-limiting example only and that any defined time period may be employed. In this manner, the capacity monitoring component 110 seeks to avoid the enablement (or disablement) of marginal servers 120, i.e. active servers that are only required for a short period of time in order to cope with a short-lived increase in workload for the computer system 100, as in such scenarios it may be more appropriate, e.g. from an energy management perspective, to manage the existing pool of active servers 120 such that the throughput time of at least part of the pending workload of the active servers 120 is reduced.

In a scenario where the capacity monitoring component 110 decides in 207 that the critical utilization of the system capacity is likely to persist for a minimum period of time, i.e. a period of time that warrants the activation of an additional server 120 to increase the number of active servers 120, the method 200 may proceed to 209 in which the system capacity utilization history is checked to determine if the number of currently active servers is below the number of servers that were active at the relevant point in time, i.e. the same point in time, in the past. If this is not the case, this may be another indication of the current critical capacity utilization being short-lived as the computer system 100 is already operating at a capacity that is typically sufficient at the relevant point in time. If this is the case, the method 200 may proceed to 211, which will be described in more detail below. Otherwise, if the number of currently active servers 120 is indeed below the number of servers that were active at the relevant point in time in the past, this is an indication that the current capacity of the computer system 100 is likely to be insufficient, in which case the method 200 may proceed to 215 in which the number of active servers 120 is increased, e.g. by adding a core or a complete server to the pool of active servers 120. In an embodiment, the capacity monitoring component 110 may enable a server 120 or server core based on its geographical location relative to the already active servers 120, e.g. to achieve a relatively uniform distribution of active servers 120 across a confined space such as a data center, to avoid unnecessary clustering of active servers, which unnecessary clustering may cause undesirable local increases in temperature.

In a scenario where the capacity monitoring component 110 decides in 207 that the critical utilization of the system capacity is likely to be short-lived, the method 200 proceeds to 211 in which the capacity monitoring component 110 invokes an adjustment of the throughput performance of the active servers 120. For example, the capacity monitoring component 110 may trigger an increase in the operating voltage and/or operating frequency of the processors (cores) of the active servers 120, e.g. using dynamic voltage and frequency scaling (DVFS) techniques. Such techniques are well-known per se and are therefore not explained in further detail for the sake of brevity only. Although this causes an increase in the energy consumed by the active servers 120, this increase typically is significantly smaller than the increase in energy consumption associated with starting up and running an additional server 120 in order to increase the number of active servers 120 of the computer system 100 in order to increase the system capacity.

Figure 5:
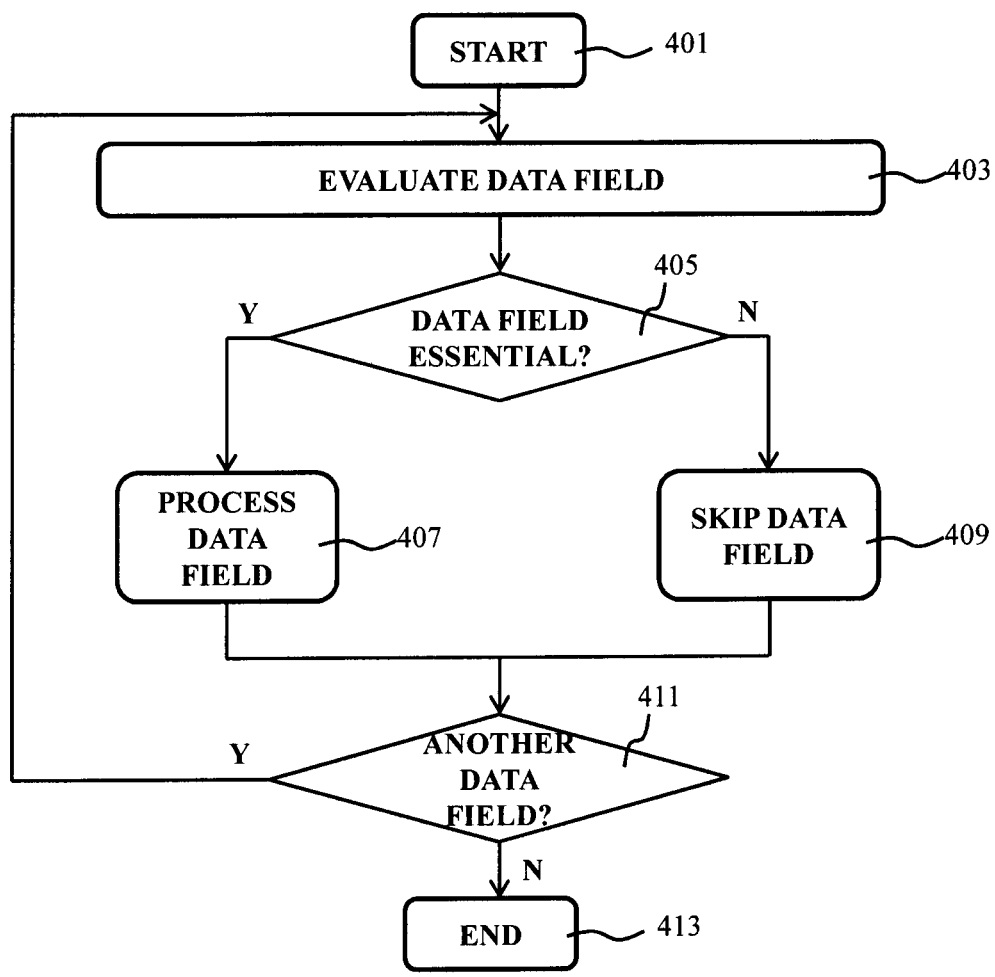
FIG. 5 is an aspect of a method implemented by a computer system according to at least some embodiments in more detail.

Alternatively or additionally, the capacity monitoring component 110 may decide to instruct the active servers 120 to selectively process their pending workload. For example, the active servers 120 may be in the process of performing a set of tasks, e.g. service requests, with the capacity monitoring component 110 instructing the active servers 120 to postpone, e.g. (temporarily) drop the execution of non-critical, i.e. non-essential, tasks in the set of tasks. This will be explained in more detail with the aid of FIG. 5, which depicts a flowchart of a task selection method 400 that may be employed by the active servers 120 to improve their throughput of critical tasks under critical capacity utilization conditions. In FIG. 5, the method 400 starts in 401, e.g. by the active servers 120 receiving an instruction from the capacity monitoring component 110 that the active servers 120 are to drop the processing of non-essential tasks in order to safeguard the throughput time of essential tasks.

For example, the active servers 120 may be adapted to process service requests, e.g. messages containing a plurality of XML fields associated with different service level agreements (SLAs), e.g. gold, silver and bronze SLAs that are associated with different levels of service to be provided by the computer system 100. The capacity monitoring component 110 may instruct the active servers 120 to only process XML fields associated with a particular SLA, e.g. gold customers only, and to temporarily ignore XML fields associated with lower-level SLAs, for as long as the capacity monitoring component 110 decides throughput controlling measures are necessary to avoid unacceptable delays to critical workload, e.g. critical or essential tasks associated with high-level SLAs. The XML fields may be tagged with metadata indicating whether or not the XML field is a critical or essential XML field. In this manner, the processing of non-essential data may be postponed during critical capacity utilization of the available system capacity such that the throughput time of essential data can be guaranteed.

In 403, the active servers 120 evaluate the metadata associated with a data field to be processed and decide in 405 if the data field is an essential data field, e.g. a data field associated with a certain level of SLA that requires processing at all times. If an active server 120 decides in 405 that the data field is an essential data field, method 400 proceeds to 407 in which the data field is processed, otherwise the method 400 proceeds to 409 in which the data field is dropped. It is subsequently checked in 411 if the task that is processed contains further data fields for evaluation. If this is the case, the method 400 reverts back to 403, otherwise the method 400 terminates in 413.

As will be appreciated by the skilled person, a more fine-grained approach to such schema-based prioritization of the workload of the active servers 120 is of course feasible. For example, in case of service request messages containing a plurality of XML fields, a multi-level prioritization scheme may be employed using different prioritization thresholds to decide if the processing of the data associated with the XML field may be postponed, e.g. temporarily dropped. For example, a Level 1 field may be a field that is always to be processed, a Level 2 field may be a field that may be dropped when the system capacity utilization exceeds 90%, a Level 3 field may be a field that may be dropped when the system capacity utilization exceeds 70%, and so on. Other suitable schema-based prioritization approaches may be employed, as will be immediately apparent to the skilled person.

Now, upon returning to FIG. 3, the capacity monitoring component 110 may check in 213 if the throughput control measures employed in 211 have reduced the capacity utilization of the computer system 100 to below a critical threshold. If this is the case, the method 200 may proceed to 217, otherwise the method 200 may proceed to 215 in which the number of active servers 120 is increased as explained above in order to ensure that critical workload processed by the active servers 120 is processed sufficiently quickly, as in this scenario the throughput control measures employed in 211 alone may not guarantee the desired throughput performance.

In the embodiment in FIG. 3, the method 200 automatically increases the number of active servers 120 if it is decided that the utilization of the capacity of the computer system 100 has become critical, which critical utilization is expected to continue long enough to warrant an increase of the number of active servers 120 and that the number of active servers is below a typical value for that particular point in time as explained above. However, it should be understood that this is a non-limiting example only. In general terms, embodiments of the present invention provide a computer-implemented method for managing the throughput performance of the computer system 100 based on the predictive information provided by the historical capacity utilization monitoring data, in which the capacity monitoring component 110 may employ a suite of throughput management techniques based on the nature of the prediction provided by the historical capacity utilization monitoring data, which suite of throughput management techniques may include DVFS techniques, schema-based task prioritization techniques and server addition techniques, in which servers are typically added to the active pool of servers only when the prediction provided by the historical capacity utilization monitoring data indicates that the need for additional capacity is likely to be persistent or when other throughput management techniques have failed to sufficiently lower the capacity utilization of the system capacity. In this manner, the start-up of marginal servers 120 is avoided or at least reduced.

Figure 4:
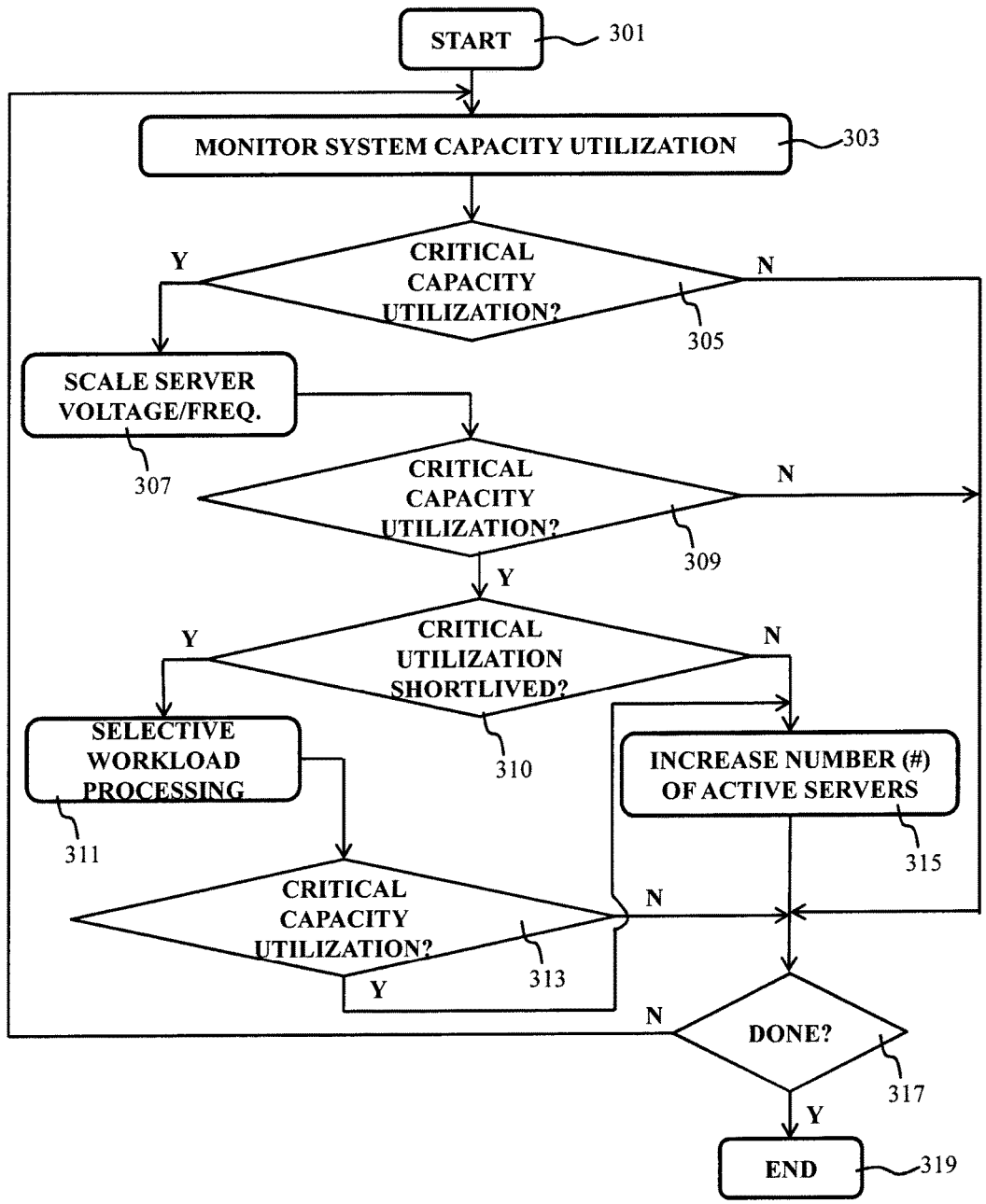
FIG. 4 is a flow chart of a method implemented by a computer system according to another embodiment.

FIG. 4 is a flowchart of an alternative example embodiment of such a throughput management method 300, which may be at least in part deployed by the capacity monitoring component 110 as previously explained. The method 300 starts in 301, which may be identical to 201 of method 200 as described above. The method 300 proceeds to 303, which may be identical to 203 of method 200 as described above. Next, as in 205, it is determined in 305 if the utilization of the system capacity is reaching critical values. If this is not the case, the method 300 may proceed to 317 in which it is decided if the capacity monitoring component 110 should continue monitoring the system capacity utilization, in which case the method 300 reverts back to 303. Otherwise, the method 300 terminates in 319.

On the other hand, if the capacity monitoring component 110 decides in 305 that the capacity utilization of the computer system 100 is becoming critical, the method 300 proceeds to 307 in which the capacity monitoring component 110 deploys DVFS techniques as explained above to increase the throughput of the active servers 120. Upon deploying such DVFS techniques, the method 300 checks in 309 if the deployed DVFS techniques have sufficiently reduced the capacity utilization of the computer system 100. If this is the case, the method 300 may proceed to 317 described above, otherwise the method 300 may proceed to 310 in which it is checked if the critical utilization of the system capacity is expected to be short-lived, in analogy with 207 in method 200 as described above.

In this embodiment, if it is decided in 310 that the critical utilization of the system capacity is expected to persist long enough to warrant the deployment of additional server capacity, e.g. an additional core or complete server, the method 300 proceeds to 315 in which the additional server capacity is deployed in analogy with 215 of method 200 as described above. On the other hand, if it is decided in 310 that are critical utilization of the system capacity is expected to be short-lived, the method 300 may proceed to 311 in which the computer system 100 deploys selective workload processing, i.e. processing of essential workload only, for instance by deployment of a schema-based prioritization algorithm as described in more detail above.

After deployment of such selective workload processing, it is checked in 313 if the selective workload processing has lowered the utilization of the system capacity to below a critical level, e.g. below a critical threshold. If this is the case, the method 300 may proceed to 317 described above. However, if this is not the case, a risk exists that critical workload, e.g. essential tasks, are not processed quickly enough by the computer system 100 due to the critical utilization of the system capacity, in which case the method 300 may proceed to 315 and deploy additional server capacity despite the fact that such additional server capacity may be marginal capacity in case of a short-lived increase in demand for system capacity. In this embodiment, the likelihood of the creation of marginal server capacity is minimized by deploying such capacity as a measure of last resort where throughput control measures deployed to the already active servers 120 have failed to sufficiently reduce the utilization rate of the system capacity, i.e. have failed to guarantee the throughput of critical workload processed by the active servers 120.

Aspects of the present invention may be a (computer) system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of aspects of this invention.

What is claimed is:

1. A computer-implemented method of managing a system comprising a pool of servers including a number of active servers, the method comprising:

monitoring, by one or more processors, utilization of system capacity, the utilization resulting from a workload of the number of active servers; and detecting a critical utilization of the system, the detecting comprising:

predicting, by the one or more processors, a duration of the detected critical utilization of the system capacity from a monitoring history of the utilization of the system capacity, wherein the predicted duration comprises a first period of time; and determining, by the one or more processors, based on the predicted duration, if the predicted duration exceeds a defined threshold, wherein the defined threshold comprises a second period of time, wherein by exceeding the defined threshold, the monitored system capacity utilization would deviate from the monitoring history at a relevant point in time by more time than the second period of time, and wherein by exceeding the defined threshold, the one or more processors determine that increased system overhead is required to handle the detected critical utilization for the predicted duration;

based on the predicted duration exceeding the defined threshold, increasing the number of active servers to handle the detected critical utilization for the predicted duration; and based on the predicted duration not exceeding the defined threshold, invoking an adjustment of throughput performance of the active servers to handle the detected critical utilization for the predicted duration.

2. The computer-implemented method of claim 1, wherein the predicted duration exceeded the defined threshold, and wherein determining the predicted duration exceeded the defined threshold based on deviating from the monitoring history at the relevant point in time by more time than the second period of time, comprises comparing an actual number of active servers against the monitoring history of the utilization of the system capacity, the monitoring history comprising an indication of a typical number of required active servers at a relevant point in time, the method further comprising:

increasing the number of active servers based on the actual number of active servers being lower than the typical number of required active servers at the relevant point in time.

3. The computer-implemented method of claim 1, wherein the predicted duration exceeded the defined threshold, further comprising reducing a throughput time for at least part of the workload of the active servers based on detecting the critical utilization of the system capacity.

4. The computer-implemented method of claim 3, wherein the throughput time for the at least part of the workload of the active servers is reduced based on an actual number of active servers at least matching a typical number of required active servers at a relevant point in time based on a duration of the critical utilization of the system capacity being below a defined duration.

5. The computer-implemented method of claim 3, wherein the reducing the throughput time for the at least part of the workload of the active servers based on detecting the critical utilization of the system capacity comprises reducing the throughput time for at least a selection of tasks from a set of tasks performed by the active servers.

6. The computer-implemented method of claim 5, wherein the reducing the throughput time for the at least the selection of tasks from the set of tasks performed by the active servers comprises postponing execution of non-critical tasks in the set of tasks.

7. The computer-implemented method of claim 3, wherein the reducing the throughput time for the at least part of the workload of the active servers based on detecting the critical utilization of the system capacity further comprises increasing at least one of an operating voltage and an operating frequency of the number of active servers.

8. The computer-implemented method of claim 3, further comprising performing one of:
increasing the number of active servers based on the monitored utilization of the system capacity remaining critical after reducing the throughput time for the at least part of the workload of the active servers based on detecting the critical utilization of the system capacity; or
terminating reducing the throughput time for the at least part of the workload of the active servers based on detecting the critical utilization of the system capacity based on the monitored utilization of the system capacity no longer being critical after reducing the throughput time for the at least part of the workload of the active servers based on detecting the critical utilization of the system capacity.

9. A computer system comprising:
a memory;
one or more processors in communication with the memory;
program instructions executable by the one or more processors via the memory to perform a method, the method comprising:
monitoring, by the one or more processors, utilization of system capacity, the utilization resulting from a workload of the number of active servers; and
detecting a critical utilization of the system, the detecting comprising:
predicting, by the one or more processors, a duration of the detected critical utilization of the system capacity from a monitoring history of the utilization of the system capacity, wherein the predicted duration comprises a first period of time; and
determining, by the one or more processors, based on the predicted duration, if the predicted duration exceeds a defined threshold, wherein the defined threshold comprises a second period of time, wherein by exceeding the defined threshold, the monitored system capacity utilization would deviate from the monitoring history at a relevant point in time by more time than the second period of time, and wherein by exceeding the defined threshold, the one or more processors determine that increased system overhead is required to handle the detected critical utilization for the predicted duration;
based on the predicted duration exceeding the defined threshold, increasing the number of active servers to handle the detected critical utilization for the predicted duration; and
based on the predicted duration not exceeding the defined threshold, invoking an adjustment of throughput performance of the active servers to handle the detected critical utilization for the predicted duration.

10. The computer system of claim 9, wherein the predicted duration exceeded the defined threshold, and wherein determining the predicted duration exceeded the defined threshold based on deviating from the monitoring history at the relevant point in time by more time than the second period of time, comprises comparing an actual number of active servers against the monitoring history of the utilization of the system capacity, the monitoring history comprising an indication of a typical number of required active servers at a relevant point in time, the method further comprising:
increasing the number of active servers based on the actual number of active servers being lower than the typical number of required active servers at the relevant point in time.

11. The computer system of claim 9, wherein the predicted duration exceeded the defined threshold, wherein the method further comprises reducing a throughput time for at least part of the workload of the active servers based on detecting the critical utilization of the system capacity.

12. The computer system of claim 11, wherein the throughput time for the at least part of the workload of the active servers is reduced based on an actual number of active servers at least matching a typical number of required active servers at a relevant point in time based on a duration of the critical utilization of the system capacity being below a defined duration.

13. The computer system of claim 11, wherein the reducing the throughput time for the at least part of the workload of the active servers based on detecting the critical utilization of the system capacity comprises at least one of:
reducing the throughput time for at least a selection of tasks from a set of tasks performed by the active servers; or
increasing at least one of an operating voltage and an operating frequency of the number of active servers.

14. The computer system of claim 11, wherein the method further comprises performing one of:
increasing the number of active servers based on the monitored utilization of the system capacity remaining critical after reducing the throughput time for the at least part of the workload of the active servers based on detecting the critical utilization of the system capacity; or
terminating reducing the throughput time for the at least part of the workload of the active servers based on detecting the critical utilization of the system capacity based on the monitored utilization of the system capacity no longer being critical after reducing the throughput time for the at least part of the workload of the active servers based on detecting the critical utilization of the system capacity.

15. A computer program product for managing a system comprising a pool of servers including a number of active servers, the computer program product comprising:

a non-transitory computer readable storage medium readable by a processing circuit and storing instructions for execution by the processing circuit for performing a method comprising:

monitoring, by one or more processors, utilization of system capacity, the utilization resulting from a workload of the number of active servers; and detecting a critical utilization of the system, the detecting comprising:

predicting, by the one or more processors, a duration of the detected critical utilization of the system capacity from a monitoring history of the utilization of the system capacity, wherein the predicted duration comprises a first period of time; and determining, by the one or more processors, based on the predicted duration, if the predicted duration exceeds a defined threshold, wherein the defined threshold comprises a second period of time, wherein by exceeding the defined threshold, the monitored system capacity utilization would deviate from the monitoring history at a relevant point in time by more time than the second period of time, and wherein by exceeding the defined threshold, the one or more processors determine that increased system overhead is required to handle the detected critical utilization for the predicted duration;

based on the predicted duration exceeding the defined threshold, increasing the number of active servers to handle the detected critical utilization for the predicted duration; and based on the predicted duration not exceeding the defined threshold, invoking an adjustment of throughput performance of the active servers to handle the detected critical utilization for the predicted duration.

16. The computer program product of claim 15, wherein the predicted duration exceeded the defined threshold, and wherein determining the predicted duration exceeded the defined threshold based on deviating from the monitoring history at the relevant point in time by more time than the second period of time, comprises comparing an actual number of active servers against the monitoring history of the utilization of the system capacity, the monitoring history comprising an indication of a typical number of required active servers at a relevant point in time, the method further comprising:

increasing the number of active servers based on the actual number of active servers being lower than the typical number of required active servers at the relevant point in time.

17. The computer program product of claim 15, wherein the predicted duration exceeded the defined threshold, wherein the method further comprises reducing a throughput time for at least part of the workload of the active servers based on detecting the critical utilization of the system capacity.

18. The computer program product of claim 17, wherein the throughput time for the at least part of the workload of the active servers is reduced based on an actual number of active servers at least matching a typical number of required active servers at a relevant point in time based on a duration of the critical utilization of the system capacity being below a defined duration.

19. The computer program product of claim 17, wherein the reducing the throughput time for the at least part of the workload of the active servers based on detecting the critical utilization of the system capacity comprises at least one of:

reducing the throughput time for at least a selection of tasks from a set of tasks performed by the active servers; or increasing at least one of an operating voltage and an operating frequency of the number of active servers.

20. The computer program product of claim 17, wherein the method further comprises performing one of:

increasing the number of active servers based on the monitored utilization of the system capacity remaining critical after reducing the throughput time for the at least part of the workload of the active servers based on detecting the critical utilization of the system capacity; or terminating reducing the throughput time for the at least part of the workload of the active servers based on detecting the critical utilization of the system capacity based on the monitored utilization of the system capacity no longer being critical after reducing the throughput time for the at least part of the workload of the active servers based on detecting the critical utilization of the system capacity.

* * * * *